Figure 1:
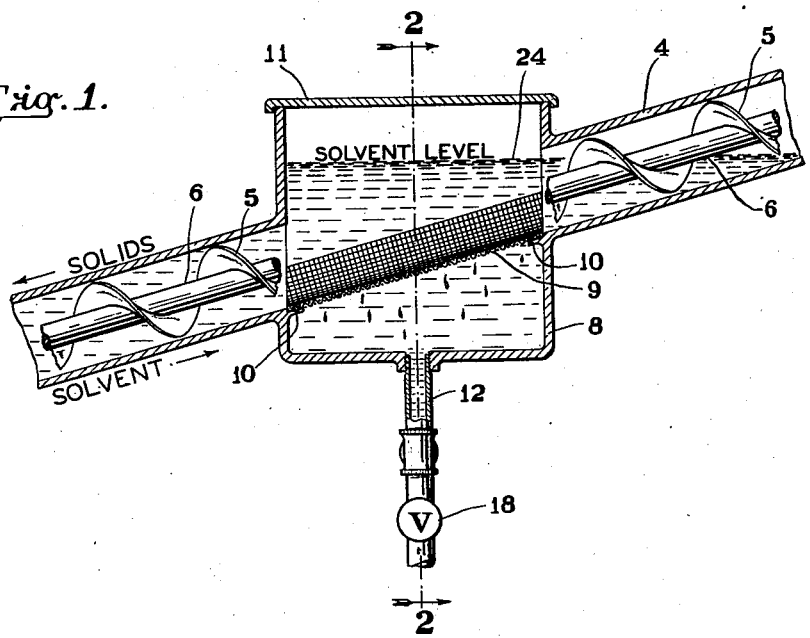

June 15, 1943.   A. A. LEVINE ET AL   2,321,923
APPARATUS FOR EXTRACTION
Filed April 26, 1940

INVENTORS.
ARTHUR A. LEVINE
AND ROY J. DENT
BY E. H. O'Brien
ATTORNEY.

Patented June 15, 1943

2,321,923

UNITED STATES PATENT OFFICE 2,321,923

APPARATUS FOR EXTRACTION

Arthur A. Levine and Roy Jackson Dent, Niagara Falls, N. Y., assignors to E. I. du Pont de Nemours & Company, Wilmington, Del., a corporation of Delaware Application April 26, 1940, Serial No. 331,682

1 Claim. (Cl. 23—270)

This invention relates to an apparatus particularly suitable for use in processes wherein soluble materials are extracted from solid particles, usually in the flaked or finely comminuted condition, by means of a liquid solvent such as benzene, naphtha, trichlorethylene, perchlorethylene, or other solvent. An illustration of such a process is the extraction of oleaginous matter from soy beans, ordinarily in the flaked or finely comminuted condition, by means of a chlorinated hydrocarbon solvent such as trichlorethylene.

More particularly, our invention relates to the removal of the miscella from the solid particles, from which the extractable matter has been extracted by means of a liquid solvent, in such a way that clogging of the filter screens through which the miscella is drawn off is entirely avoided.

It is customary in commercial methods for extracting soluble materials such as oils, fats and waxes from solid particles to employ extraction apparatus of the countercurrent type. In the usual form of counter-current apparatus the flaked or finely comminuted solid from which the oleaginous matter is to be extracted is caused to travel through the extraction apparatus in a direction counter-current to the direction of flow of the oncoming solvent. Usually means are provided to insure forcing the flaked or finely divided solid material through the extraction apparatus in a direction opposite to the direction in which the liquid solvent is permitted to travel through the equipment.

Counter-current extraction apparatus of a type now familiar in the extraction industry frequently utilizes two tubes or conduits joined together at their point of intersection, thus providing a continuous V-shaped conduit. The solvent is introduced at the top of one of the legs of the V, and the miscella removed somewhere adjacent the upper portion of the other leg. The solvent is generally fed into the apparatus from an elevation somewhat above that of the miscella outlet, and then flows downwardly through one tube and upwardly through the other tube to the miscella outlet. Flow against the resistance of the tubes is insured by providing an adequate head of solvent above the miscella outlet. The solid material, in the counter-current apparatus, is usually conveyed by some conveyor means in a direction opposite to that of solvent flow.

In the past considerable difficulty has been experienced in removing the miscella from the solid material remaining in the extraction apparatus. The miscella is the mixture or solution of the extracted material in the solvent which must be removed from the residual solid particles in order that it may be further treated to recover the valuable oleaginous materials contained therein. The solid particles, frequently flaked or finely divided, which are subjected to extraction in commercial processes, are often of lower specific gravity than the solvent. This is especially true where chlorinated hydrocarbon solvents such as trichlorethylene, perchlorethylene, carbon tetrachloride, tetrachlorethane, etc. are utilized. Under such circumstances there is a definite tendency for the flaked or finely comminuted solid particles to float on or adjacent the upper surface of the solvent. In the usual counter-current extraction apparatus the miscella is removed from the extraction column adjacent an upper level of the solvent, since the solid particles are ordinarily conveyed downwardly through one portion of the extraction tube while the solvent flows upwardly through this portion, counter-current to the solid, to an outlet pipe from which it is removed for treatment in order to recover dissolved oleaginous matter. In the past the fine particles floating on the upper surface of the solvent have accumulated adjacent the screen or filter through which the miscella is drawn off, and have seriously interfered with withdrawal of the miscella by clogging the screen. In present commercial operations not only is the removal of miscella seriously interfered with by clogging of the screen due to the presence in the solvent of floating solid material, but the apparatus has to be frequently disassembled, and the filtering surface or screen subjected to cleaning at frequent intervals.

It is the principal object of this invention to provide equipment for use in counter-current extraction processes which will permit the withdrawal of the miscella from the extraction apparatus without interference with the withdrawal because of filter screen clogging. In other words, it is one of our principal aims to provide equipment in which there is substantially no danger that solid particles will deposit on and clog the filter screen through which the solution of oily materials in solvent is removed from the apparatus.

Another object of our invention relates to improving the process of extracting oleaginous materials from solid particles in a counter-current extraction apparatus by insuring easy removal of the miscella from the extraction apparatus, this being accomplished by preventing interference with filtering as the result of clogging of the filter screens. By utilizing our improved apparatus, continuous removal of the miscella is insured by operating so that the solid particles floating in the extraction column do not tend to accumulate adjacent the filters.

Still other objects of our invention involve the provision of a weir or dam, or of a conduit acting as such, positioned at a higher level than the level of the filter screen or screens so that the solid particles floating on the surface of the liquid will be maintained at a level higher than that of the screen. In this way the miscella may be withdrawn without any danger of interruption due to screen clogging. Other objects of our invention will be apparent from the ensuing disclosure of certain improved embodiments thereof.

Figure 2:
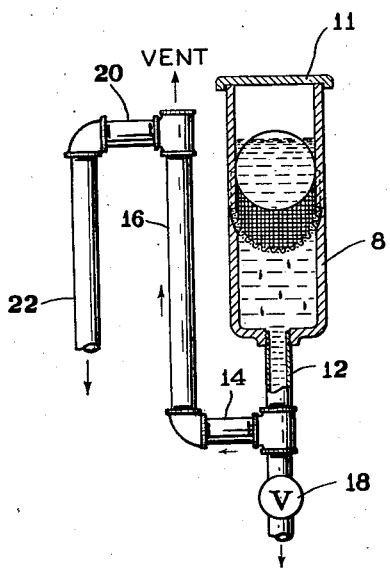

Our invention may best be described with reference to the annexed drawing which represents a preferred but not necessarily the only embodiment of our improved apparatus. Figure 1 represents a cross-sectional view of the miscella withdrawal portion of an extraction apparatus constructed in accordance with our invention, that part of the conveyor adjacent the filter being omitted for the sake of clarity. Figure 2 is a cross-sectional view, some parts being illustrated in elevation, which cross-sectional view is taken at right angles to the cross-section of Figure 1, substantially on the line 2—2 of Figure 1, the section being viewed in the direction of the arrows.

Referring more specifically to the drawing, the arrows and legends on Figure 1 illustrate the direction of travel of the solid particles from which oleaginous material is to be extracted, and the direction of flow of solvent, opposite to that of the solid materials, through the equipment. The portion of the extraction tube shown represents but part of one leg of the usual counter-current extraction apparatus comprising two sections of tube joined together at their point of intersection to form a continuous V-shaped conduit as shown, for example, in the patent to Hutchinson No. 126,300 and in that to Wheeler No. 550,035.

The solid material, which is usually in the flaked or finely comminuted condition, is forced downwardly through this section of the extraction tube by means of a conveyor, while the solvent travels upwardly through this portion of the tube. The conveyor may have the form of a screw conveyor as illustrated, or it may be of any other convenient type.

In spite of the fact that positive means are provided for conveying the solid particles through the extraction apparatus, there is a tendency for "fines" or very small fragments of the solid material to resist positive conveyance and float on the surface of the solvent. In other words, as extraction continues, there is a tendency for some of the solid particles to accumulate adjacent the upper level of the solvent. The portion of the solid material which thus escapes positive conveyance through the extraction apparatus tends to accumulate adjacent the upper level of the liquid. In past operations, where the filter screens are located adjacent the upper level of the solvent, which of course is necessarily the case where the outlet for miscella determines the level of solvent in the leg of the apparatus shown, these solid particles have deposited in and on the filter screen and have clogged that screen, thereby interrupting normal extraction operations.

The construction shown in the drawing definitely eliminates any such tendency. The numeral 4 represents the extraction tube through which the solid materials from which oleaginous matters are to be extracted are propelled in the direction indicated by the arrow by means of screw conveyor 5 rotating on shaft 6. As previously stated, the solvent flows upwardly through this section of the extraction tube 4 in a direction counter-current to that of the solid material.

The extraction apparatus is provided adjacent its upper end with outlet box 8 with removable cover 11, which surrounds extraction tube 4 and serves for the removal of miscella from the extraction tube. While this outlet box 8 is most conveniently located somewhere adjacent the upper end of the apparatus, it is of course not necessary that it be positioned adjacent an upper level, as it may be located anywhere in the extraction apparatus from which point it is desired to withdraw the miscella.

In the outlet box 8 there is positioned a screen or filter 9 which is seated on extending lips or supports 10 formed on the extraction tube 4. As shown, the filter screen has approximately half the area of the circumferential interior area of the extraction tube.

The interior of outlet box 8 communicates with conduit 12, through which the miscella is discharged. This conduit is provided with a horizontal discharge pipe 14 communicating with it, which discharge pipe 14 in turn communicates with vertical pipe 16. Discharge pipe 22 communicates with pipe 16 through the horizontal connecting pipe 20. There is provided, as shown, a vent in the upper portion of pipe 16 so that discharge of air or vapors to the atmosphere is readily accomplished. Venting is readily effected by leaving the pipe 16 uncapped at this end, open to the atmosphere.

The flow line of horizontal connecting pipe 20 establishes the level of solvent in the extraction apparatus. This pipe therefore serves as a dam or weir over which miscella must flow after having been removed from the extraction apparatus through screen or filter 9 and conduits 12, 14, and 16. It is evident that the level of the flow line of pipe 20 determines the level 24 of the liquid solvent within the extraction tube 4. The level 24 is either identical with that of the flow line or may, under some circumstances, be slightly above it, thus providing a head for the flow of miscella thru the filter.

It is evident that solid particles which tend to float on the solvent within the extraction tube will accumulate adjacent the level of the liquid indicated by the numeral 24. Since this level is above the level of the screen 9, there will be no tendency for the particles to accumulate adjacent that filter screen 9. There therefore will be no tendency whatever for solid particles to clog the filter screen 9, since all solid particles are maintained, because of the elevation of discharge pipe 20, at the level 24 of the solvent within the extraction tube, which level is considerably above the level of the filter screen.

Conduit 12 is, as shown, provided with a valve 18. When this valve is opened, liquid present within the outlet box 8 may be withdrawn from the extraction apparatus without going through conduits 16, 20 and 22. This procedure may be followed when it is desired to completely drain the apparatus.

The extraction apparatus and process herein described are not restricted in their use to methods in which a soluble material is extracted by means of a solvent, but are of general application wherever a solid is suspended in and tends to float on the surface of a liquid. Our invention might therefore be utilized for purposes entirely unrelated to solvent extraction, such as, for example, in an apparatus wherein oil or any other liquid is treated with a decolorizing agent under circumstances wherein solid particles of decolorizing agent, or other solid particles, would have a tendency to float on the surface of the oil or liquid.

It should be understood that our invention is not restricted to the precise details described as illustrative of certain improved embodiments thereof. Many changes might be made in the construction as described which would still come within the scope of our invention. Accordingly, the scope of the invention is to be construed in accordance with the appended claim and prior art.

We claim:

In a counter-current extraction apparatus for extracting a desired constituent by means of a solvent therefor from solid particles having a specific gravity less than the solvent, an inclined tube leading from and to a filtering chamber interposed in the upper end thereof, a conveyor in said tube extending through said chamber and arranged to convey the solid particles downwardly through said tube against upwardly flowing solvent, a filtering screen arranged in said chamber to form a continuation of the bottom portion of said tube, a solvent outlet conduit from said chamber below said screen, said conduit and chamber being so arranged and constructed as to provide a solvent trap, whereby the solvent level in said chamber is maintained above the filtering area of the screen.

ARTHUR A. LEVINE.
ROY JACKSON DENT.